US010436106B2

(12) United States Patent
Ono et al.

(10) Patent No.: US 10,436,106 B2
(45) Date of Patent: Oct. 8, 2019

(54) CONTROL APPARATUS AND CONTROL METHOD FOR INTERNAL COMBUSTION ENGINE (71) Applicants: Mitsubishi Electric Corporation, Tokyo (JP); Mazda Motor Corporation, Hiroshima (JP)

(72) Inventors: Takahiko Ono, Hyogo (JP); Takafumi Nishio, Hiroshima (JP)

(73) Assignees: Mitsubishi Electric Corporation, Tokyo (JP); MAZDA MOTOR CORPORATION, Hiroshima (JP)

( * ) Notice: Subject to any disclaimer, the term of this patent is extended or adjusted under 35 U.S.C. 154(b) by 282 days.

(21) Appl. No.: 15/268,732

(22) Filed: Sep. 19, 2016

(65) Prior Publication Data

US 2017/0184013 A1 Jun. 29, 2017

(30) Foreign Application Priority Data

Dec. 24, 2015 (JP) .................................. 2015-251159

(51) Int. Cl.
*F02B 37/18* (2006.01)
*F02B 33/40* (2006.01)
(Continued)

(52) U.S. Cl.
CPC ............ *F02B 37/186* (2013.01); *F02B 33/40* (2013.01); *F02B 37/18* (2013.01);
(Continued)

(58) Field of Classification Search
CPC ...... F02B 37/18; F02B 37/183; F02B 37/186; F02D 41/2464; F02D 41/0007; F02D 2250/16
See application file for complete search history.

(56) References Cited

U.S. PATENT DOCUMENTS 4,702,080 A * 10/1987 Ueno ...................... F02B 37/18
60/602
2014/0338307 A1* 11/2014 Kokotovic .............. F02B 37/22
60/273

(Continued)

FOREIGN PATENT DOCUMENTS

JP 2006274834 A * 10/2006
JP 4434057 B2 3/2010
(Continued)

*Primary Examiner* — Thai Ba Trieu
*Assistant Examiner* — Jessica L Kebea
(74) *Attorney, Agent, or Firm* — Sughrue Mion, PLLC; Richard C. Turner (57) ABSTRACT A required opening correction amount is calculated based on a target supercharging pressure and an actual supercharging pressure, a target opening is calculated based on a required opening and the required opening correction amount, an actual operating position of a wastegate valve is determined to correspond to a fully closed position when the wastegate valve is in a fully closed condition, an actual opening of the wastegate valve is calculated based on the fully closed position and the actual operating position, an operation amount of an actuator for aligning the target opening with the actual opening is calculated based on the target opening and the actual opening, and when the target opening corresponds to the fully closed condition and the actual operating position is not decreased at or above a prescribed rate, the fully closed position is updated to the actual operating position.

5 Claims, 3 Drawing Sheets (51) Int. Cl.
*F02D 41/00* (2006.01)
*F02D 41/24* (2006.01)
*F02D 23/02* (2006.01)

(52) U.S. Cl.
CPC ..... *F02D 41/0007* (2013.01); *F02D 41/2464* (2013.01); *F02D 23/02* (2013.01); *F02D 2200/0406* (2013.01); *F02D 2250/16* (2013.01)

(56) References Cited

U.S. PATENT DOCUMENTS

2016/0305312 A1* 10/2016 Ismail .................. F02B 37/183
2017/0051698 A1*  2/2017 Zielinski ............. F02D 41/2441
2018/0119607 A1*  5/2018 Ono ....................... F02D 23/00

FOREIGN PATENT DOCUMENTS

| JP | 2015-59549 A | | 3/2015 | |
| --- | --- | --- | --- | --- |
| JP | 2015-166571 A | | 9/2015 | |
| JP | 2017115662 A | * | 6/2017 | ............ F02B 37/186 |

\* cited by examiner

CONTROL APPARATUS AND CONTROL METHOD FOR INTERNAL COMBUSTION ENGINE

BACKGROUND OF THE INVENTION

1. Field of the Invention

This invention relates to a control apparatus and a control method applied to an internal combustion engine including a turbocharger, with which an opening of a wastegate valve provided in an exhaust gas bypass passage is controlled using an electric actuator.

2. Description of the Related Art

An internal combustion engine including a turbocharging device such as a turbocharger has been put to practical use conventionally with the aim of improving output. Note that a turbocharger is a device that compresses intake air supplied to an internal combustion engine main body by rotating a turbine using energy from exhaust gas and driving a compressor connected to the turbine.

Further, in a well-known technique applied to an internal combustion engine having a turbocharger, an exhaust gas bypass passage that bypasses the turbine is provided in an exhaust gas passage of the internal combustion engine, and a wastegate valve is provided in the exhaust gas bypass passage.

By adjusting an opening of the wastegate valve, a flow rate of the exhaust gas flowing through the exhaust gas bypass passage, or in other words the flow rate of the exhaust gas flowing into the turbine, is adjusted, and as a result, the pressure of the intake air compressed by the compressor that rotates integrally with the turbine is controlled. The pressure of the intake air compressed by the compressor will be referred to hereafter as a supercharging pressure.

Furthermore, to realize a desired supercharging pressure corresponding to operating conditions of the internal combustion engine, a control apparatus applied to an internal combustion engine having a turbocharger determines a target opening of the wastegate valve and performs feedback control so that an actual opening of the wastegate valve, detected by a position sensor, matches the target opening.

However, it is known that due to individual differences and temporal variation in respective component characteristics of the turbocharger, the wastegate valve, and driving systems thereof, as well as temperature variation and so on, a difference may occur in the actual opening of the wastegate valve even when identical operation amounts are applied to an actuator that drives the wastegate valve, and a difference may occur in the actual supercharging pressure even when the actual opening of the wastegate valve remains constant. When such differences occur, it becomes impossible to realize the desired supercharging pressure.

Hence, to solve this problem, a technique of learning a deviation in a fully closed position of the wastegate valve, which is one of the main causes of these differences, has been proposed.

More specifically, a method of controlling the supercharging pressure by calculating a target supercharging pressure and a base opening of the wastegate valve for realizing the target supercharging pressure in accordance with the operating conditions of the internal combustion engine, calculating an opening correction amount on the basis of a deviation between the target supercharging pressure and the actual supercharging pressure, and feedback-controlling driving of the actuator so that the actual opening of the wastegate valve matches the target opening has been proposed (see Japanese Patent Publication No. 4434057, for example).

Further, to solve the problem described above, Japanese Patent Publication No. 4434057 discloses learning the fully closed position of the wastegate valve on the basis of the opening correction amount on condition that the internal combustion engine is warm, and indicates that by learning the fully closed position in this manner, a deviation in the fully closed position of the wastegate valve can be corrected, with the result that the desired supercharging pressure can be realized.

Furthermore, a method of controlling the supercharging pressure by calculating the target opening of the wastegate valve in accordance with the operating conditions of the internal combustion engine and feedback-controlling driving of the actuator so that the actual opening of the wastegate valve matches the target opening has been proposed (see Japanese Patent Application Publication No. 2015-59549, for example).

Moreover, to solve the problem described above, Japanese Patent Application Publication No. 2015-59549 discloses controlling the wastegate valve to the fully closed position initially when the target opening is the fully closed position, and then determining whether or not the wastegate valve has converged on the fully closed position on the basis of whether or not the actual opening of the wastegate valve is fluctuating about a fixed value in the vicinity of the fully closed position.

Next, Japanese Patent Application Publication No. 2015-59549 discloses learning the fully closed position of the wastegate valve on the basis of the output of the position sensor at this time, and correcting the fully closed position in accordance with temperature variation following the point at which the fully closed position is learned. Japanese Patent Application Publication No. 2015-59549 indicates that by learning and correcting the fully closed position in this manner, a deviation in the fully closed position of the wastegate valve can be corrected, with the result that the desired supercharging pressure can be realized.

SUMMARY OF THE INVENTION

In Japanese Patent Publication No. 4434057, the target opening is corrected by updating the opening correction amount until the actual supercharging pressure matches the target supercharging pressure such that the deviation between the target supercharging pressure and the actual supercharging pressure is eventually eliminated. Further, the fully closed position is learned on the assumption that the opening correction amount at this time corresponds to an amount of deviation in the fully closed position of the wastegate valve.

However, a deviation between the target supercharging pressure and the actual supercharging pressure does not occur only due to a deviation in the fully closed position of the wastegate valve, and is known to occur due to other factors, such as pressure loss in an intake air passage of the internal combustion engine and variation in a supercharging efficiency of the turbocharger, for example.

Therefore, in a case where a deviation occurs between the target supercharging pressure and the actual supercharging pressure due to a factor other than a deviation in the fully closed position of the wastegate valve, the deviation is learned erroneously as the deviation in the fully closed position. At this time, the actual supercharging pressure continues to be controlled to the desired supercharging pressure as long as the operating conditions do not change, but when the operating conditions change, an actual effect of the cause of the deviation between the target supercharging pressure and the actual supercharging pressure varies. Hence, the controllability of the supercharging pressure deteriorates every time the operating conditions vary.

Further, in Japanese Patent Application Publication No. 2015-59549, the fully closed position of the wastegate valve is learned on the basis of the output of the position sensor at the point where the wastegate valve is controlled to the fully closed position, and therefore the fully closed position can be learned accurately. Hence, when the target supercharging pressure deviates from the actual supercharging pressure due to a deviation in the fully closed position, the deviation between the target supercharging pressure and the actual supercharging pressure is eliminated by learning the fully closed position, and as a result, the desired supercharging pressure can be realized.

However, in a case where the target supercharging pressure deviates from the actual supercharging pressure due to a factor other than a deviation in the fully closed position of the wastegate valve, the deviation between the target supercharging pressure and the actual supercharging pressure cannot be eliminated, and therefore the deviation between the target supercharging pressure and the actual supercharging pressure is not eliminated even when the fully closed position is learned correctly.

Furthermore, when the fully closed position is updated during fully closed position learning control according to Japanese Patent Application Publication No. 2015-59549, the fully closed position is limited to a value within a range sandwiched between a lower limit and an upper limit of an operating range of the wastegate valve. In other words, when the value at which the wastegate valve is determined to have converged on the fully closed position is lower than the lower limit, for example, the lower limit value is employed as the fully closed position, thereby ensuring that a fully closed position below the lower limit is not set.

However, when the value at which the wastegate valve is determined to have converged on the fully closed position deviates from the range sandwiched between the lower limit and the upper limit, the value is highly likely to be an abnormal value. Therefore, in a case where the value at which the wastegate valve is determined to have converged on the fully closed position is lower than the lower limit and the fully closed position is updated to the lower limit value, this updating in itself probably means that the fully closed position has been learned erroneously.

Moreover, when the fully closed position is learned during the fully closed position learning control according to Japanese Patent Application Publication No. 2015-59549, feedback control is performed by setting a target having a smaller opening than a stopper position on a closed side such that the wastegate valve strikes the fully closed position forcefully. The wastegate valve is then determined to have converged on the fully closed position when the actual opening of the wastegate valve fluctuates about a fixed value in the vicinity of the fully closed position, and the output of the position sensor at that time is learned as the fully closed position.

In actuality, however, it is impossible for an operating position of the wastegate valve to reach a target having a smaller opening than the stopper position on the closed side, and therefore a condition in which the deviation between the target opening and the actual opening is not eliminated inevitably occurs and remains established until learning is complete. Hence, the fully closed position is updated continuously until learning is complete, leading to an increase in the operation amount of the actuator, or in other words an increase in a driving force of the actuator.

Here, when the driving force of the actuator increases in a condition where the wastegate valve is pressed against the fully closed position, a joint member forming a link mechanism that connects the wastegate valve to the actuator bends. Note that driving the actuator continuously at an excessive operation amount is undesirable in terms of heat generation and power consumption in a motor.

When the joint member bends, a movable shaft of the actuator moves by an amount corresponding to the bend in the joint member, which occurs due to the increasing driving force of the actuator, even though the fully closed position does not actually vary, and therefore the output of the position sensor varies gradually toward a side on which the opening of the wastegate valve decreases such that the opening no longer fluctuates about the fixed value. As a result, the determination of convergence on the fully closed position is greatly delayed.

The wastegate valve is eventually determined to have converged on the fully closed position when either the driving force of the actuator reaches a maximum value or the bend in the joint portion reaches a limit at which further bending does not occur. Due to the delay in the determination of convergence on the fully closed position, however, the wastegate valve is pressed against the fully closed position by an increased actuator driving force resulting from continuous updating of the fully closed position, and the fully closed position is learned in this condition. As a result, an erroneous fully closed position on the small opening side by an amount corresponding to the bend in the joint member is learned.

This invention has been designed to solve the problems described above, and an object thereof is to obtain a control apparatus and control method for an internal combustion engine, with which a fully closed position of a wastegate valve can be learned correctly, with the result that a desired supercharging pressure can be realized, regardless of whether or not the cause of a deviation between a target supercharging pressure and an actual supercharging pressure is a deviation in the fully closed position of the wastegate valve.

A control apparatus for an internal combustion engine according to this invention is applied to an internal combustion engine that includes: a turbocharger that has a turbine provided in an exhaust gas passage of the internal combustion engine and a compressor provided in an intake air passage of the internal combustion engine so as to rotate integrally with the turbine; an exhaust gas bypass passage that is provided in the exhaust gas passage so as to connect an upstream side and a downstream side of the turbine; a wastegate valve that is provided in the exhaust gas bypass passage so as to adjust a flow rate of exhaust gas flowing through the exhaust gas bypass passage; an actuator that is driven to modify an operating position of the wastegate valve; a position sensor that detects the operating position of the wastegate valve, and a supercharging pressure sensor that detects a pressure of intake air compressed by the compressor as an actual supercharging pressure, the control apparatus including: a target supercharging pressure calculation unit that calculates a target value of a supercharging pressure, the supercharging pressure being the pressure of the intake air compressed by the compressor, as a target supercharging pressure on the basis of an operating condition of the internal combustion engine; a required opening calculation unit that calculates a required opening required of the wastegate valve on the basis of the target supercharging pressure; a required opening correction amount calculation unit that calculates a required opening correction amount on the basis of the target supercharging pressure and the actual supercharging pressure; a target opening calculation unit that calculates a target opening of the wastegate valve for aligning the actual supercharging pressure with the target supercharging pressure on the basis of the required opening and the required opening correction amount; an actual opening calculation unit that determines that an actual operating position of the wastegate valve, detected by the position sensor, corresponds to a fully closed position when the wastegate valve completely blocks the exhaust gas bypass passage, and calculates an actual opening of the wastegate valve on the basis of the fully closed position and the actual operating position of the wastegate valve; an actuator operation amount calculation unit that calculates an operation amount of the actuator for aligning the target opening with the actual opening on the basis of the target opening and the actual opening; and a fully closed position learning unit that, when the target opening corresponds to a fully closed condition and the actual operating position is not decreased at or above a preset prescribed rate, updates the fully closed position to the actual operating position at that time.

Further, a control method for internal combustion engine according to this invention is applied to an internal combustion engine that includes: a turbocharger that has a turbine provided in an exhaust gas passage of the internal combustion engine and a compressor provided in an intake air passage of the internal combustion engine so as to rotate integrally with the turbine; an exhaust gas bypass passage that is provided in the exhaust gas passage so as to connect an upstream side and a downstream side of the turbine; a wastegate valve that is provided in the exhaust gas bypass passage so as to adjust a flow rate of exhaust gas flowing through the exhaust gas bypass passage; an actuator that is driven to modify an operating position of the wastegate valve; a position sensor that detects the operating position of the wastegate valve; and a supercharging pressure sensor that detects a pressure of intake air compressed by the compressor as an actual supercharging pressure, the control method including: a target supercharging pressure calculation step of calculating a target value of a supercharging pressure as a target supercharging pressure on the basis of an operating condition of the internal combustion engine, the supercharging pressure being the pressure of the intake air compressed by the compressor; a required opening calculation step of calculating a required opening required of the wastegate valve on the basis of the target supercharging pressure; a required opening correction amount calculation step of calculating a required opening correction amount on the basis of the target supercharging pressure and the actual supercharging pressure; a target opening calculation step of calculating a target opening of the wastegate valve for aligning the actual supercharging pressure with the target supercharging pressure on the basis of the required opening and the required opening correction amount; an actual opening calculation step of determining that an actual operating position of the wastegate valve, detected by the position sensor, corresponds to a fully closed position when the wastegate valve completely blocks the exhaust gas bypass passage, and calculating an actual opening of the wastegate valve on the basis of the fully closed position and the actual operating position of the wastegate valve; an actuator operation amount calculation step of calculating an operation amount of the actuator for aligning the target opening with the actual opening on the basis of the target opening and the actual opening; and a fully closed position learning step of updating, when the target opening corresponds to a fully closed condition and the actual operating position is not decreasing at or above a preset prescribed rate, the fully closed position to the actual operating position at that time.

With the control apparatus and control method for internal combustion engine according to this invention, the target supercharging pressure calculation unit calculates the target value of the supercharging pressure, the supercharging pressure being the pressure of the intake air compressed by the compressor, as the target supercharging pressure on the basis of the operating condition of the internal combustion engine, the required opening calculation unit calculates the required opening required of the wastegate valve on the basis of the target supercharging pressure, the required opening correction amount calculation unit calculates the required opening correction amount on the basis of the target supercharging pressure and the actual supercharging pressure, the target opening calculation unit calculates the target opening of the wastegate valve for aligning the actual supercharging pressure with the target supercharging pressure on the basis of the required opening and the required opening correction amount, the actual opening calculation unit determines that the actual operating position of the wastegate valve, detected by the position sensor, corresponds to the fully closed position when the wastegate valve completely blocks the exhaust gas bypass passage, and calculates the actual opening of the wastegate valve on the basis of the fully closed position and the actual operating position of the wastegate valve, the actuator operation amount calculation unit calculates the operation amount of the actuator for aligning the target opening with the actual opening on the basis of the target opening and the actual opening, and when the target opening corresponds to the fully closed condition and the actual operating position is not decreasing at or above the preset prescribed rate, the fully closed position learning unit updates the fully closed position to the actual operating position at that time.

Hence, the fully closed position of the wastegate valve can be learned correctly regardless of whether or not the cause of the deviation between the target supercharging pressure and the actual supercharging pressure is a deviation in the fully closed position of the wastegate valve, and as a result, the desired supercharging pressure can be realized.

DESCRIPTION OF THE PREFERRED EMBODIMENTS

A preferred embodiment of a control apparatus and a control method for an internal combustion engine according to this invention will be described below using the drawings.

Identical or corresponding parts of the drawings will be described using identical reference numerals.

First Embodiment

Figure 1:
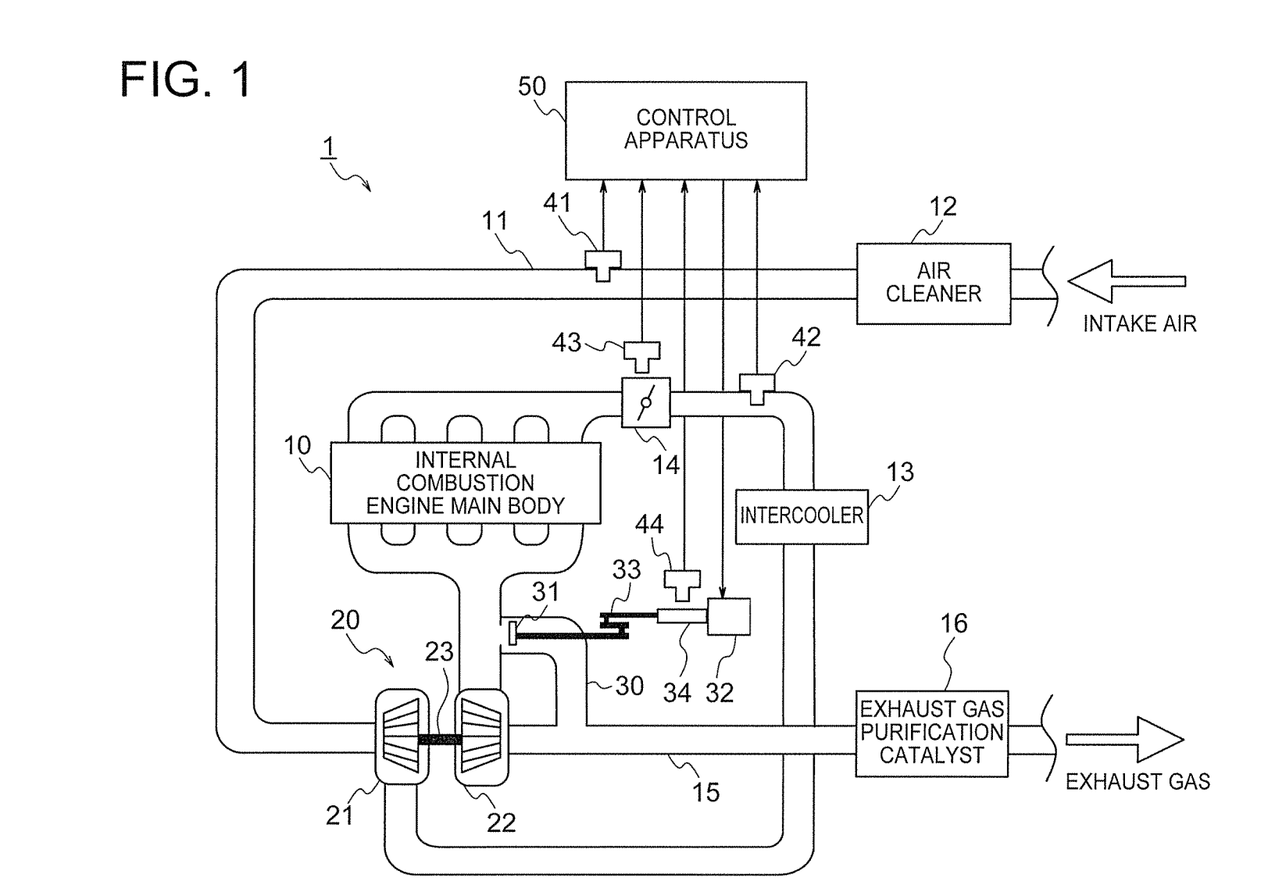
FIG. 1 is a view showing a configuration of an overall system to which a control apparatus for an internal combustion engine according to a first embodiment of this invention is applied.

FIG. 1 is a view showing a configuration of an overall system to which a control apparatus for an internal combustion engine according to a first embodiment of this invention is applied. In FIG. 1, an intake air passage 11 connected to an internal combustion engine main body 10 is provided in an intake system of an internal combustion engine 1. An air cleaner 12 for cleaning intake air is attached to an inlet of the intake passage 11. Further, an air flow sensor 41 that detects an intake air amount is provided in the intake air passage 11 on a downstream side of the air cleaner 12.

A turbocharger 20 that compresses the intake air is provided in the intake air passage 11 on a downstream side of the air flow sensor 41. The turbocharger 20 is constituted by a compressor 21 and a turbine 22. Further, the compressor 21 and the turbine 22 are connected integrally by a connecting shaft 23 such that the compressor 21 is driven to rotate by energy from exhaust gas flowing into the turbine 22.

An intercooler 13 that cools the compressed air is provided in the intake air passage 11 on a downstream side of the compressor 21. Further, a throttle valve 14 that adjusts an amount of air delivered to the internal combustion engine main body 10 is provided in the intake air passage 11 on a downstream side of the intercooler 13.

Note that a supercharging pressure sensor 42 that detects a pressure of the intake air compressed by the compressor 21 is provided between the intercooler 13 and the throttle valve 14. Further, a throttle opening sensor 43 that detects an opening of the throttle valve 14 is provided on the throttle valve 14.

Furthermore, an exhaust gas passage 15 connected to the internal combustion engine main body 10 is provided in an exhaust system of the internal combustion engine 1. The turbine 22 of the turbocharger 20 is provided midway in the exhaust gas passage 15.

Moreover, an exhaust gas bypass passage 30 that connects an upstream side of the turbine 22 to a downstream side while bypassing the turbine 22 is provided in the exhaust gas passage 15. The wastegate valve 31 is provided in the exhaust gas bypass passage 30 as an exhaust gas bypass valve that adjusts a flow rate of exhaust gas flowing through the exhaust gas bypass passage 30. Further, an exhaust gas purification catalyst 16 that purifies the exhaust gas is provided in the exhaust gas passage 15 on a downstream side of the turbine 22.

The wastegate valve 31 provided in the exhaust gas bypass passage 30 is mechanically connected to one end of a joint member 33 forming a link mechanism that connects the wastegate valve 31 to an actuator 32 serving as a driving apparatus of the exhaust gas bypass valve. Further, the other end of the joint member 33 is mechanically connected to an actuator output shaft 34 of the actuator 32.

Furthermore, a position sensor 44 that detects position information relating to an opening position of the wastegate valve 31 is provided in the vicinity of the actuator output shaft 34. Note that in the first embodiment of this invention, the position sensor 44 is indicated as being a separate body to the actuator 32, but the position sensor 44 may be built into the actuator 32.

Further, a control apparatus 50 is connected to the internal combustion engine 1. Various sensors, such as the airflow sensor 41, the supercharging pressure sensor 42, the throttle opening sensor 43, the position sensor 44, and a crank angle sensor not shown in the drawing, which detects a rotation angle of a crankshaft of the internal combustion engine main body 10, are connected to an input portion of the control apparatus 50 so that the control apparatus 50 can detect operating conditions of the internal combustion engine 1.

Moreover, the actuator 32 and various other actuators not shown in the drawing, such as an injector and an ignition coil of the internal combustion engine main body 10, are connected to an output portion of the control apparatus 50 so that the control apparatus 50 can control the operating conditions of the internal combustion engine 1. By driving the various actuators described above on the basis of input information from the various sensors described above, the control apparatus 50 controls the pressure of the intake air compressed by the compressor 21 to a desired supercharging pressure, and controls a combustion condition and an output torque of the internal combustion engine 1 to optimum values.

Furthermore, the actuator 32 includes an inbuilt motor that is capable of rotating both normally and in reverse, and the actuator output shaft 34 that converts a rotary motion of the motor into a linear motion and outputs the linear motion. The actuator output shaft 34 is capable of moving in an axial direction in accordance with an energization direction of the motor such that when the motor is energized in a direction for pulling the actuator output shaft 34 toward an inner side of the actuator 32, the wastegate valve 31 can be moved to an open side, or in other words the right side of FIG. 1, via the joint member 33.

When, on the other hand, the motor is energized in a direction for pushing the actuator output shaft 34 toward an outer side of the actuator 32, the wastegate valve 31 can be moved to a closed side, or in other words the left side of FIG. 1, via the joint member 33. Furthermore, the position sensor 44 is provided in the vicinity of a side portion of the actuator output shaft 34 so that an axial direction position of the actuator output shaft 34, detected by the position sensor 44, is taken into the control apparatus 50 as an actual operating position of the wastegate valve 31.

Figure 2:
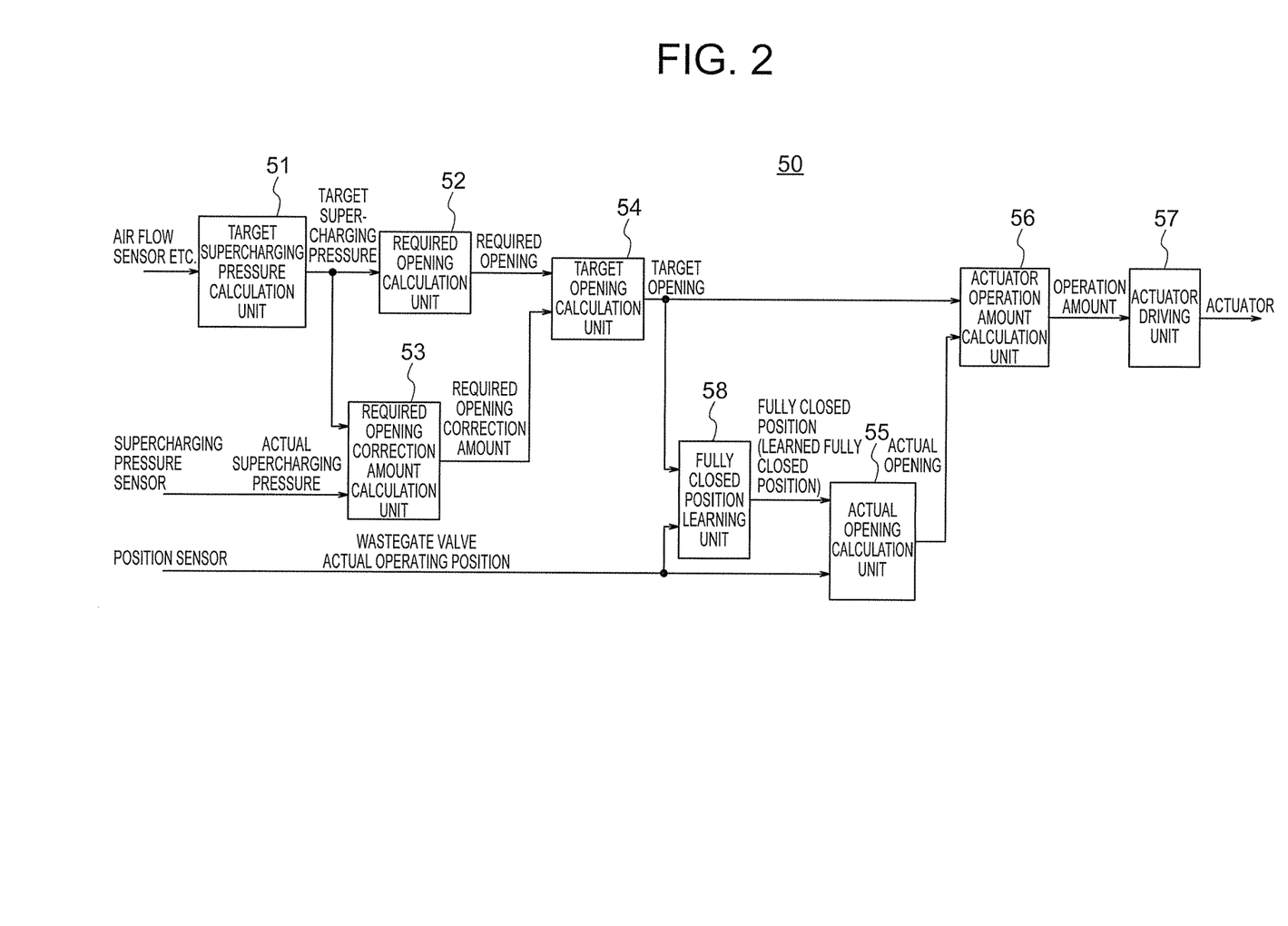
FIG. 2 is a block diagram showing the control apparatus for an internal combustion engine according to the first embodiment of this invention.

FIG. 2 is a block diagram showing the control apparatus for an internal combustion engine according to the first embodiment of this invention. In FIG. 2, the control apparatus 50 includes a target supercharging pressure calculation unit 51, a required opening calculation unit 52, a required opening correction amount calculation unit 53, a target opening calculation unit 54, an actual opening calculation unit 55, an actuator operation amount calculation unit 56, an actuator driving unit 57, and a fully closed position learning unit 58.

Here, the control apparatus 50 is constituted by a microprocessor having a CPU (a Central Processing Unit) that executes calculation processing and a memory that stores a program. Further, the respective blocks forming the control apparatus 50 are stored in a storage unit as software.

First, configurations and operations relating to basic control of the opening of the wastegate valve 31 will be described. The target supercharging pressure calculation unit 51 calculates a target value of the supercharging pressure, i.e. the pressure of the intake air compressed by the compressor 21, as a target supercharging pressure on the basis of operating conditions such as the rotation speed of the internal combustion engine 1, which corresponds to the output of the crank angle sensor, and the intake air amount detected by the air flow sensor 41.

The required opening calculation unit 52 calculates a required opening required of the wastegate valve 31 on the basis of the target supercharging pressure calculated by the target supercharging pressure calculation unit 51. The required opening correction amount calculation unit 53 calculates a required opening correction amount on the basis of the target supercharging pressure calculated by the target supercharging pressure calculation unit 51 and an actual supercharging pressure detected by the supercharging pressure sensor 42.

The target opening calculation unit 54 calculates a target opening of the wastegate valve 31 for aligning the actual supercharging pressure with the target supercharging pressure on the basis of the required opening required of the wastegate valve 31, calculated by the required opening calculation unit 52, and the required opening correction amount calculated by the required opening correction amount calculation unit 53.

The actual opening calculation unit 55 calculates the actual opening of the wastegate valve 31 on the basis of a condition in which the wastegate valve 31 completely blocks the exhaust gas bypass passage 30, or in other words a fully closed position serving as an operating position of the wastegate valve 31 when in a fully closed condition, and the actual operating position of the wastegate valve 31, i.e. the axial direction position of the actuator output shaft 34, detected by the position sensor 44.

When, for example, a width of an output voltage of the position sensor 44 in a case where the opening of the wastegate valve 31 varies from the fully closed position to a fully open position is set as Vrng [V], a voltage in the fully closed position is set as Vmin [V], an output voltage of the position sensor 44 indicating the actual operating position of the wastegate valve 31 is set as Vs [V], and the actual opening of the wastegate valve 31 is set as Pv [%], the actual opening Pv is expressed by Equation (1), shown below. Note that initial design values of Vrng [V] and Vmin [V] are stored in advance in the memory of the control apparatus 50.

$$Pv=(Vs-Vmin)/Vrng \times 100 [\%] \quad (1)$$

The actuator operation amount calculation unit 56 calculates an operation amount for driving the actuator 32 on the basis of the target opening of the wastegate valve 31, calculated by the target opening calculation unit 54, and the actual opening of the wastegate valve 31, calculated by the actual opening calculation unit 55. Note that the operation amount of the actuator 32 is calculated by performing feedback control such as PID control on the basis of a deviation between the target opening and the actual opening of the wastegate valve 31.

The actuator driving unit 57 supplies a current corresponding to the operation amount of the actuator 32, calculated by the actuator operation amount calculation unit 56, to the actuator 32. Accordingly, the actuator 32 is driven, whereby the operating position, or in other words the opening, of the wastegate valve 31 varies. Note that the operation amount of the actuator 32 is a parameter indicating the energization direction and current of the motor built into the actuator 32, and is given by a PWM signal such as a duty signal having a range of −100% to +100%, for example.

Next, configurations and operations relating to control for learning the fully closed position of the wastegate valve 31 will be described. When the actuator operation amount calculation unit 56 determines that the target opening calculated by the target opening calculation unit 54 is 0%, or in other words that a full closing request has been issued, the actuator operation amount calculation unit 56 sets a virtual target opening in order to set the wastegate valve 31 reliably in the fully closed condition.

Further, on the basis of the virtual target opening, rather than the target opening calculated by the target opening calculation unit 54, and the actual opening of the wastegate valve 31, calculated by the actual opening calculation unit 55, the actuator operation amount calculation unit 56 calculates an operation amount of the actuator 32 for aligning the target opening with the actual opening, and outputs the calculated operation amount to the actuator driving unit 57.

Furthermore, when the target opening calculated by the target opening calculation unit 54 is 0% and the actual operating position of the wastegate valve 31, detected by the position sensor 44, is within a preset variation range of the fully closed position, the actuator operation amount calculation unit 56 limits an operation amount of the actuator 32 for moving the wastegate valve 31 to the closed side to or below a preset prescribed value, and outputs the result to the actuator driving unit 57. Note that the prescribed value may be set to vary in accordance with the exhaust gas flow rate or the exhaust gas pressure, for example.

Further, the aforesaid virtual target opening is determined by inserting a voltage value corresponding to a lower limit operating position of a preset range serving as the variation range of the fully closed position of the wastegate valve 31 into Vs [V] in Equation (1). Note that the variation range of the fully closed position is set in advance as a range in which the fully closed position of the wastegate valve 31 varies, and is stored in the memory of the control apparatus 50.

For example, when a voltage value corresponding to the lower limit operating position of the variation range of the fully closed position is set at 1.0 [V], Vrng=2.5 [V], and Vmin=1.5[V], the virtual target opening is determined in accordance with Equation (1) as (1.0-1.5)/2.5×100=−20 [%].

When the operation amount of the actuator 32 calculated on the basis of the virtual target opening, determined in the manner described above, and the actual opening of the wastegate valve 31, calculated by the actual opening calculation unit 55, is output to the actuator driving unit 57 and the actuator 32 is driven, the wastegate valve 31 moves toward the fully closed side so as to completely block the exhaust gas bypass passage.

When the target opening calculated by the target opening calculation unit 54 is determined to be 0%, or in other words when a full closing request is issued, the fully closed position learning unit 58 determines whether or not the actual operating position of the wastegate valve 31, detected by the position sensor 44, is within the preset variation range of the fully closed position.

Further, when the actual operating position of the wastegate valve 31, detected by the position sensor 44, is within the variation range of the fully closed position and has stopped decreasing at or above a preset prescribed rate, the fully closed position learning unit 58 determines that the exhaust gas bypass passage 30 is completely blocked by the wastegate valve 31.

At this time, the fully closed position learning unit 58 updates the voltage Vmin [V] in the fully closed position to the current output voltage Vs [V] of the position sensor 44, or in other words learns the voltage Vmin [V] in the fully closed position. Thereafter, the actual opening calculation unit 55 calculates the actual opening Pv [%] of the wastegate valve 31 from Equation (1) using the updated learned fully closed position Vmin [V].

Figure 3:
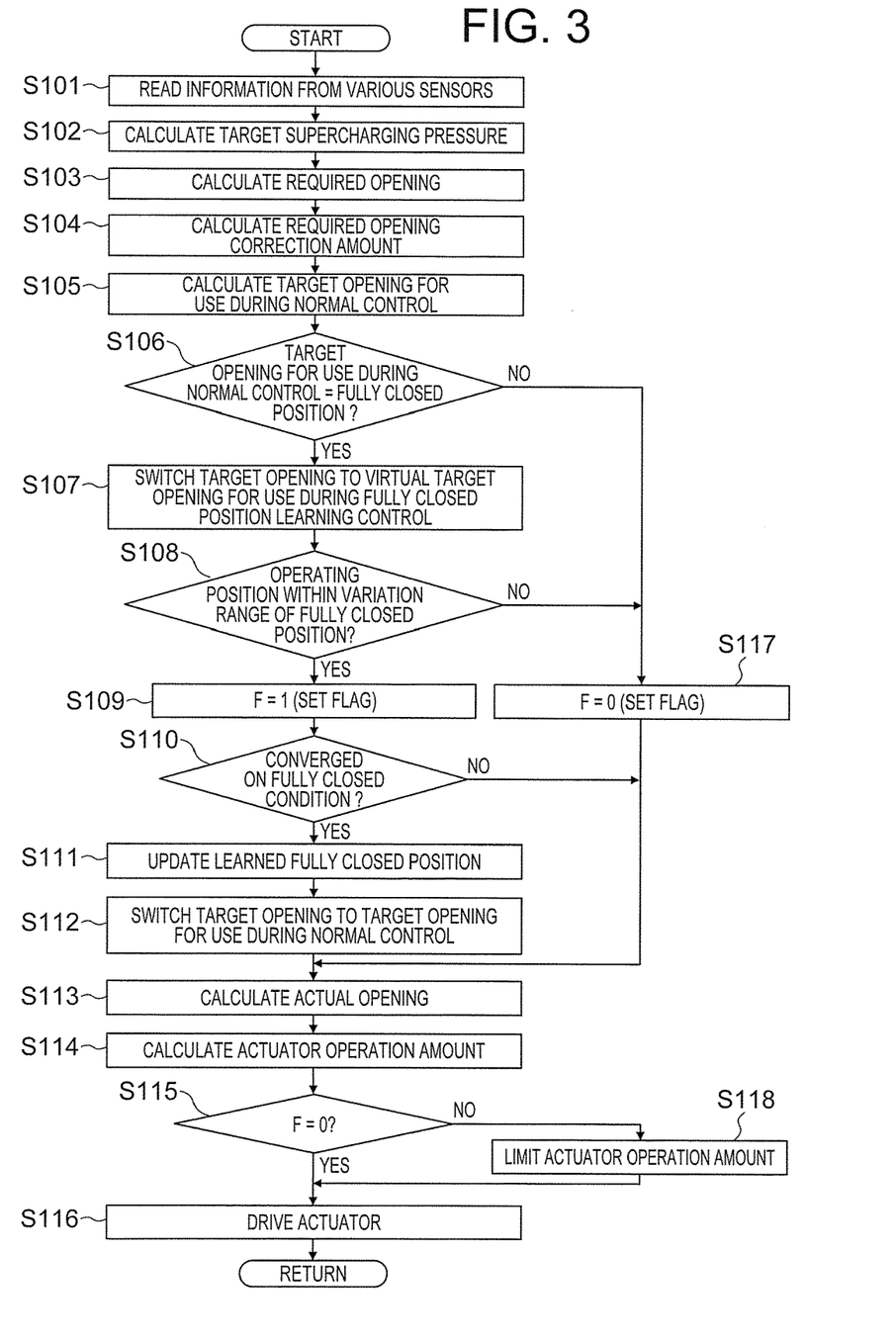
FIG. 3 is a flowchart showing an operation of the control apparatus for an internal combustion engine according to the first embodiment of this invention.

Processing executed by the control apparatus 50 will be described below with reference to a flowchart shown in FIG. 3. FIG. 3 is a flowchart showing an operation of the control apparatus for an internal combustion engine according to the first embodiment of this invention.

In FIG. 3, first, the target supercharging pressure calculation unit 51 reads information from the various sensors, such as the rotation speed of the internal combustion engine 1, the intake air amount detected by the air flow sensor 41, the actual supercharging pressure detected by the supercharging pressure sensor 42, and the actual operating position of the wastegate valve 31, detected by the position sensor 44 (step S101).

Next, the target supercharging pressure calculation unit 51 calculates the target supercharging pressure on the basis of operating conditions such as the rotation speed and intake air amount of the internal combustion engine 1, among the information from the various sensors read in step S101 (step S102).

Next, the required opening calculation unit 52 calculates the required opening required of the wastegate valve 31 on the basis of the target supercharging pressure calculated in step S102 (step S103).

Further, the required opening correction amount calculation unit 53 calculates the required opening correction amount by performing feedback control on the basis of the actual supercharging pressure read in step S101 and the target supercharging pressure calculated in step S102 (step S104).

Next, the target opening calculation unit 54 calculates the target opening of the wastegate valve 31 for aligning the actual supercharging pressure with the target supercharging pressure on the basis of the required opening required of the wastegate valve 31, calculated in step S103, and the required opening correction amount calculated in step S104 (step S105). Here, the target opening calculated in step S105 will be referred to as a target opening for use during normal control.

Next, the actuator operation amount calculation unit 56 determines whether or not the target opening for use during normal control, calculated in step S105, corresponds to the fully closed position (step S106).

Having determined in step S106 that the target opening for use during normal control, calculated in step S105, corresponds to the fully closed position (i.e. Yes), the actuator operation amount calculation unit 56 sets the virtual target opening described above, and switches the target operating for use during normal control to the virtual target opening (step S107). Here, the virtual target opening will be referred to as a virtual target opening for use during fully closed position learning control.

Next, the fully closed position learning unit 58 determines whether or not the actual operating position of the wastegate valve 31, read in step S101, is within the preset variation range of the fully closed position (step S108). Note that the determination as to whether or not the actual operating position of the wastegate valve 31 is within the preset variation range of the fully closed position may be performed by the actuator operation amount calculation unit 56.

Having determined in step S108 that the actual operating position of the wastegate valve 31 is within the preset variation range of the fully closed position (i.e. Yes), the fully closed position learning unit 58 sets a flag F at F=1 (step S109), and then determines whether or not the actual operating position of the wastegate valve 31, read in step S101, has converged on the fully closed condition (step S110).

In the first embodiment of this invention, the determination as to whether or not the operating position of the wastegate valve 31 has converged on the fully closed condition is made on the basis of whether or not the actual operating position of the wastegate valve 31, read in step S101, has stopped decreasing at or above the preset prescribed rate continuously for at least a preset prescribed time, for example.

As a result, the wastegate valve 31 can be determined to be in the fully closed condition at an early stage even when the actuator output shaft 34 moves due to bending of the joint member 33 of the link mechanism despite the wastegate valve 31 being in the fully closed condition, whereby the output of the position sensor 44 varies gradually toward a side on which the opening of the wastegate valve decreases such that the opening no longer fluctuates about a fixed value.

Having determined in step S110 that the actual operating position of the wastegate valve 31 has converged on the fully closed condition (i.e. Yes), the fully closed position learning unit 58 updates the learned fully closed position Vmin [V] to the output voltage Vs [V] of the position sensor 44 corresponding to the current actual operating position of the wastegate valve 31 (step S111).

Next, the actuator operation amount calculation unit 56 switches the virtual target opening for use during fully closed position learning control, to which the target opening is switched in step S107, to the target opening for use during normal control, calculated in step S105 (step S112).

Next, the actual opening calculation unit 55 calculates the actual opening of the wastegate valve 31 in accordance with Equation (1) on the basis of the actual operating position of the wastegate valve 31, read in step S101, and the learned fully closed position (step S113).

Next, the actuator operation amount calculation unit 56 calculates the operation amount of the actuator 32 by performing feedback control on the basis of either the target opening for use during normal control, which is calculated in step S105 or to which the target opening is switched in step S112, or the virtual target opening for use during fully closed position learning control, to which the target opening is switched in step S107, and the actual opening of the wastegate valve 31, calculated in step S113 (step S114).

Next, the actuator operation amount calculation unit 56 determines whether or not the flag F is at F=0 (step s115).

When it is determined in step S115 that the flag F is at F=0 (i.e. Yes), the actuator driving unit 57 drives the actuator 32 at the operation amount of the actuator 32 calculated in step S114 (step S116), whereupon the processing of FIG. 3 is terminated. As a result, the wastegate valve 31 is controlled to either the target opening for use during normal control or the virtual target opening for use during fully closed position learning control.

Meanwhile, when it is determined in step S106 that the target opening for use during normal control, calculated in step S105, does not correspond to the fully closed position (i.e. No) or it is determined in step S108 that the actual operating position of the wastegate valve 31 is not within the preset variation range of the fully closed position (i.e. No), the fully closed position learning unit 58 resets the flag F to F=0 (step S117), whereupon the routine advances to step S113. Note that the flag F may be reset by the actuator operation amount calculation unit 56.

Further, when it is determined in step S110 that the actual operating position of the wastegate valve 31 has not converged on the fully closed condition (i.e. No), the routine advances to step S113 as is.

Furthermore, when it is determined in step S115 that the flag F is not at F=0 (i.e. No), the actuator operation amount calculation unit 56 limits the operation amount of the actuator 32 to or below the preset prescribed value to ensure that the operation amount of the actuator 32, calculated in step S114 in order to operate the wastegate valve 31 in a direction for blocking the exhaust gas bypass passage 30, does not increase unnecessarily (step S118), whereupon the routine advances to step S115.

As a result, a situation in which the fully closed position is learned when the driving force of the actuator 32 is unnecessarily large such that the wastegate valve 31 is pressed against the fully closed position can be avoided.

Further, when the wastegate valve 31 is controlled to the virtual target opening for use during fully closed position learning control, the operating position of the wastegate valve 31 can be controlled while avoiding a situation in which the driving force of the actuator 32 becomes unnecessarily large such that the wastegate valve 31 is pressed against the fully closed position.

According to the first embodiment, as described above, the target supercharging pressure calculation unit calculates a target value of the supercharging pressure, the supercharging pressure being the pressure of the intake air compressed by the compressor, as the target supercharging pressure on the basis of the operating conditions of the internal combustion engine, the required opening calculation unit calculates the required opening required of the wastegate valve on the basis of the target supercharging pressure, the required opening correction amount calculation unit calculates the required opening correction amount on the basis of the target supercharging pressure and the actual supercharging pressure, the target opening calculation unit calculates the target opening of the wastegate valve for aligning the actual supercharging pressure with the target supercharging pressure on the basis of the required opening and the required opening correction amount, the actual opening calculation unit determines that the actual operating position of the wastegate valve, detected by the position sensor, corresponds to the fully closed position when the wastegate valve completely blocks the exhaust gas bypass passage, and calculates the actual opening of the wastegate valve on the basis of the fully closed position and the actual operating position of the wastegate valve, the actuator operation amount calculation unit calculates the operation amount of the actuator for aligning the target opening with the actual opening on the basis of the target opening and the actual opening, and when the target opening corresponds to the fully closed condition and the actual operating position is not decreasing at or above the preset prescribed rate, the fully closed position learning unit updates the fully closed position to the actual operating position at that time.

In other words, by learning the fully closed position using the position sensor output at the point where the wastegate valve is controlled to the fully closed position, the fully closed position of the wastegate valve can be learned correctly, and by performing feedback control on the basis of the target supercharging pressure and the actual supercharging pressure in order to correct the target opening of the wastegate valve so that the actual supercharging pressure matches the target supercharging pressure, the fully closed position of the wastegate valve can be learned correctly, with the result that a desired supercharging pressure can be realized, regardless of whether or not the cause of the deviation between the target supercharging pressure and the actual supercharging pressure is a deviation in the fully closed position of the wastegate valve.

What is claimed is:

1. A control apparatus for controlling a wastegate valve in an internal combustion engine, the internal combustion engine including:

a turbocharger that has a turbine provided in an exhaust gas passage of the internal combustion engine and a compressor provided in an intake air passage of the internal combustion engine so as to rotate integrally with the turbine via a shaft;

an exhaust gas bypass passage that branches off the exhaust gas passage to bypass the turbine from an upstream side to a downstream side of the turbine;

the wastegate valve that is provided in the exhaust gas bypass passage to adjust a flow rate of exhaust gas flowing through the exhaust gas bypass passage;

a wastegate actuator that is driven to modify an actual operating position of the wastegate valve;

a position sensor that detects the actual operating position of the wastegate valve and outputs a first control value corresponding to the actual operating position; and a supercharging pressure sensor that detects a pressure of intake air compressed by the compressor as an actual supercharging pressure, the control apparatus comprising:

a memory configured to store a program; and a processor configured to execute the program to implement:

a target supercharging pressure calculation unit that calculates a target value of a supercharging pressure, the supercharging pressure being the pressure of the intake air compressed by the compressor, as a target supercharging pressure on the basis of an operating condition of the internal combustion engine;

a required opening calculation unit that calculates a required opening required of the wastegate valve on the basis of the target supercharging pressure;

a required opening correction amount calculation unit that calculates a required opening correction amount on the basis of the target supercharging pressure and the actual supercharging pressure;

a target opening calculation unit that calculates a target opening of the wastegate valve for aligning the actual supercharging pressure with the target supercharging pressure on the basis of the required opening and the required opening correction amount;

an actual opening calculation unit that receives the first control value, detected by the position sensor, which corresponds to the actual operating position, retrieves a second stored control value in the memory of the control apparatus which corresponds to a fully closed position of the wastegate valve, and calculates an actual opening of the wastegate valve on the basis of the first control value and the second stored control value;

a wastegate actuator operation amount calculation unit that calculates an operation amount of the wastegate actuator for aligning the target opening with the actual opening on the basis of the target opening and the actual opening and outputs the operation amount to an actuator driving unit of the wastegate actuator to modify the actual operating position of the wastegate valve on the basis of the calculated operation amount; and a fully closed position control value learning unit that, when the target opening corresponds to the fully closed portion of the wastegate valve and the actual operating position is not decreased at or above a preset prescribed rate, updates the second stored control value to the same value as the first control value corresponding to the actual operating position at that time.

2. The control apparatus for controlling the wastegate valve in the internal combustion engine according to claim 1, wherein the fully closed position control value learning unit, while updating the second stored control value, stops updating the second stored control value when the actual operating position is outside a preset variation range of the second stored control value.

3. The control apparatus for controlling the wastegate valve in the internal combustion engine according to claim 1, wherein, when the target opening corresponds to the fully closed position of the wastegate valve and the actual operating position is within a preset variation range of the fully closed position, the wastegate actuator operation amount calculation unit limits an operation amount of the wastegate actuator for moving the wastegate valve to a closed side to be less than or equal to a preset prescribed value.

4. The control apparatus for controlling the wastegate valve in the internal combustion engine according to claim 2, wherein, when the target opening corresponds to the fully closed position of the wastegate valve and the actual operating position is within the preset variation range of the second stored control value, the wastegate actuator operation amount calculation unit limits an operation amount of the wastegate actuator for moving the wastegate valve to a closed side to be less than or equal to a preset prescribed value.

5. A control method of a controller for controlling a wastegate valve in an internal combustion engine including:
  a turbocharger that has a turbine provided in an exhaust gas passage of the internal combustion engine and a compressor provided in an intake air passage of the internal combustion engine so as to rotate integrally with the turbine via a shaft;
  an exhaust gas bypass passage that branches off the exhaust gas passage to bypass the turbine from an upstream side to a downstream side of the turbine;
  the wastegate valve that is provided in the exhaust gas bypass passage to adjust a flow rate of exhaust gas flowing through the exhaust gas bypass passage;
  a wastegate actuator that is driven to modify an actual operating position of the wastegate valve;
  a position sensor that detects the actual operating position of the wastegate valve and outputs a first control value corresponding to the actual operating position; and
  a supercharging pressure sensor that detects a pressure of intake air compressed by the compressor as an actual supercharging pressure,
  the control method comprising:

calculating, by a target supercharging pressure calculation unit of the controller, a target value of a supercharging pressure as a target supercharging pressure on the basis of an operating condition of the internal combustion engine, the supercharging pressure being the pressure of the intake air compressed by the compressor;

calculating, by a required opening calculation unit of the controller, a required opening required of the wastegate valve on the basis of the target supercharging pressure;

calculating, by a required opening correction amount calculation unit of the controller, a required opening correction amount on the basis of the target supercharging pressure and the actual supercharging pressure;

calculating, by a target opening calculation unit of the controller, a target opening of the wastegate valve for aligning the actual supercharging pressure with the target supercharging pressure on the basis of the required opening and the required opening correction amount;

receiving, by an actual opening calculation unit of the controller, a fully the first control value that corresponds to the actual operating position of the wastegate valve, detected by the position sensor, retrieving, by the actual opening calculation unit, a second stored control value in a memory of the controller which corresponds to a fully closed position of the wastegate valve, and calculating, by the actual opening calculation unit, an actual opening of the wastegate valve on the basis of the first control value and the second stored control value;

calculating, a wastegate actuator operation amount calculation unit of the controller, an operation amount of the wastegate actuator for aligning the target opening with the actual opening on the basis of the target opening and the actual opening, and outputting, by the wastegate actuator operation amount calculation unit, the operation amount to an actuator driving unit of the wastegate actuator to modify the actual operating position of the wastegate valve on the basis of the operation amount; and updating, by a fully closed position control value learning unit of the controller, when the target opening corresponds to the fully closed position of the wastegate valve and the actual operating position is not decreased at or above a preset prescribed rate, the second stored control value to be the first control value corresponding to the actual operating position at that time.

* * * * *